United States Patent [19]

Fair

[11] Patent Number: 4,705,137
[45] Date of Patent: Nov. 10, 1987

[54] MARINE SHEAR WAVE VIBRATOR

[75] Inventor: Delbert W. Fair, Ponca City, Okla.

[73] Assignee: Conoco Inc., Ponca City, Okla.

[21] Appl. No.: 499,023

[22] Filed: Jun. 1, 1983

Related U.S. Application Data

[63] Continuation of Ser. No. 212,912, Dec. 4, 1980, abandoned.

[51] Int. Cl.$^4$ .................. G01V 1/053; G01V 1/047
[52] U.S. Cl. .................................. 181/120; 181/401; 367/75
[58] Field of Search ............... 367/75, 15; 181/119, 181/120, 401; 73/662-672

[56] References Cited

U.S. PATENT DOCUMENTS

| | | | |
|---|---|---|---|
| 3,159,232 | 12/1964 | Fair | 367/75 |
| 3,365,019 | 1/1968 | Bays | 181/120 |
| 3,482,646 | 12/1969 | Brown et al. | 367/15 |
| 4,219,096 | 8/1980 | Airhart | 181/402 |
| 4,270,626 | 6/1981 | Pritchett | 181/401 |
| 4,284,163 | 8/1981 | Pritchett | 181/401 |
| 4,298,086 | 11/1981 | Pritchett | 181/119 |

FOREIGN PATENT DOCUMENTS

| | | | |
|---|---|---|---|
| 702331 | 12/1979 | U.S.S.R. | 367/75 |
| 716012 | 2/1986 | U.S.S.R. | 181/401 |

*Primary Examiner*—Nelson Moskowitz
*Attorney, Agent, or Firm*—Charles E. Quarton

[57] ABSTRACT

An underwater vibrator apparatus for generating a shear wave into the consolidated seabed has a housing, a horizontally mounted mass attached to said housing for movement along an axis substantially parallel to the surface of the earth and hydraulic apparatus for oscillating the mass along the axis. Substantially all of the vibrator housing comprises a sidewall and a bottom. The sidewalls and bottom form a wedge-shaped surface means with an angled surface of the wedge-shaped surface transverse to the movement of the mass, such that as the mass oscillates the underwater vibrator against the consolidated bottom, the vibrator will settle into the bottom. The vibrator will, however, maintain contact with the bottom even when the consolidated bottom is yieldable under vibrated weight.

6 Claims, 5 Drawing Figures

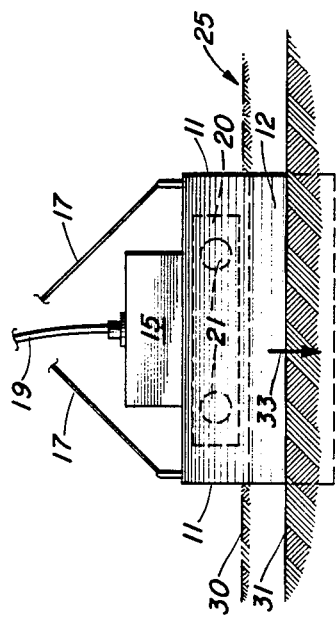
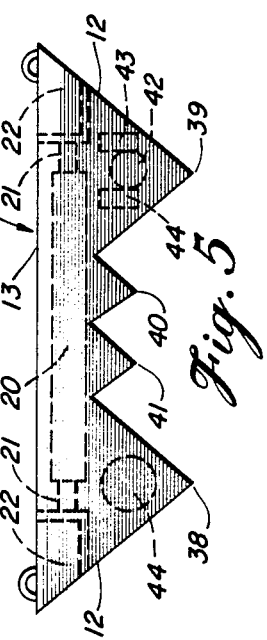
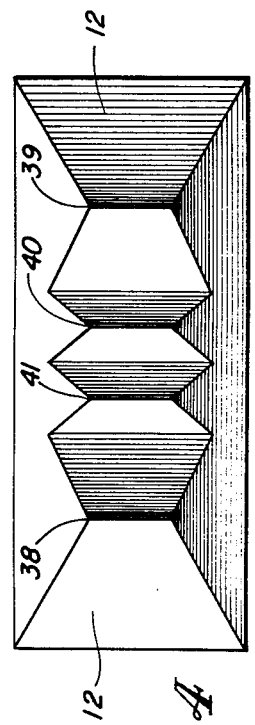
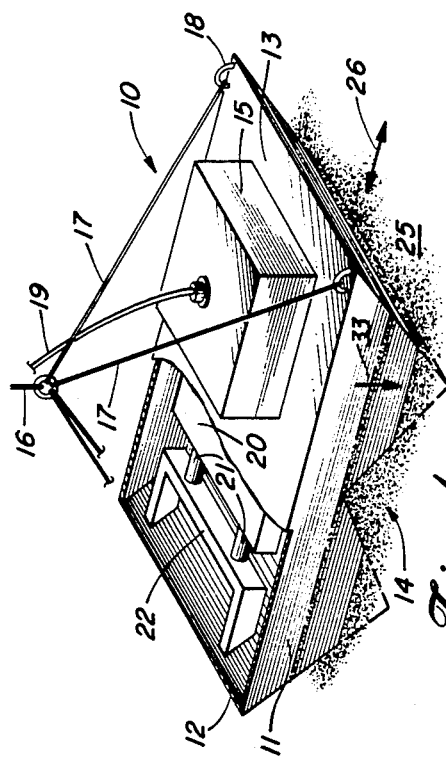
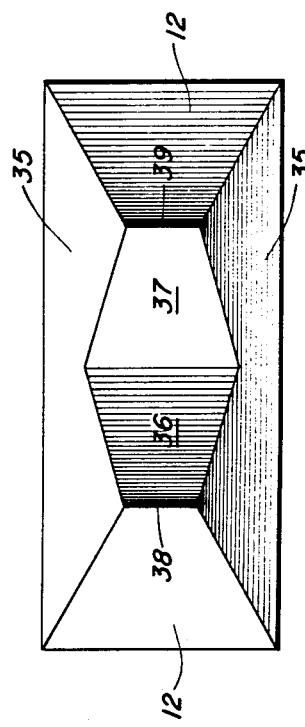

MARINE SHEAR WAVE VIBRATOR

This application is a continuation of application Ser. No. 06/212,912, filed Dec. 4, 1980, now abandoned.

PRIOR ART

Land shear wave vibrators are old in the art as evidenced by the D. W. Fair, U.S. Pat. Nos. 4,135,599 and 3,159,232. These vibrators disclose the well known means of coupling the shear wave vibrator to the ground by using pyramid-shaped wedges. These wedges are designed to provide continual coupling as the vibrator sinks into the surface of the earth.

A vibrator adaptable for marsh environment is the M. G. Bays, U.S. Pat. No. 3,365,019. This vibrator is a p-wave vibrator which operates on the principle of applying suction to the base plate so that the base plate will sink into the ground. The continual suction must be sufficient to overcome the vertical forces generated by the vibrator. As the vibrator operates the continual suction will gradually force the base plate into the unconsolidated material. The vibrator will, however, maintain adequate contact with the earth surface so that a p-wave will be generated on the earth. The vibrator, however, is not capable of generating a shear wave into the earth since unconsolidated material will not transmit a shear wave.

The G. L. Brown et al, U.S. Pat. No. 3,482,646, shows a p-wave vibrator capable of generating a pressure wave into a body of water. The pressure wave, when it strikes the bottom of the sea or water, will be communicated into the seabed and into the stratum below the seabed. The vibrator, likewise, no matter which way it should be turned, would be incapable of generating a shear wave into the earth since water cannot propogate shear waves.

BRIEF DESCRIPTION OF THE INVENTION

Broadly, this invention discloses an underwater vibrator apparatus for generating a shear wave into the consolidated bottom of the water, which vibrator includes a housing, a horizontally mounted mass attached to the housing for movement of the housing along an axis substantially parallel to the surface of the earth and a hydraulic means for applying an oscillating force against the mass along the axis.

Substantially all of the vibrator housing comprises sidewalls and a bottom which combines to form a wedge-shaped surface with the angled surfaces of the wedge-shaped surface being transverse to the axis of movement of the mass. This configuration will provide continual contact of the vibrator with the surface of the seabed as the mass oscillates, first through the unconsolidated material and then into the consolidated material. Once the vibrator has entered the consolidated material, it will begin to transmit a shear wave into the ground.

BRIEF DESCRIPTION OF THE FIGURES

FIG. 1 is a perspective view of a vibrator with a portion of the vibrator cutaway and showing the hydraulically operated mass in its interior;

FIG. 2 is an end view of FIG. 1;

FIG. 3 is a bottom view of the apparatus operated in FIG. 1 with the exception of the side plates being tapered;

FIG. 4 is a modified form of the bottom coupling; and

FIG. 5 is a side view of the configuration illustrated in FIG. 4.

DETAILED DESCRIPTION OF THE INVENTION

Referring to all of the drawings but specifically to FIG. 1, a vibrator generally referred to by the number 10 has sidewalls 11, end walls 12, top 13, and a bottom generally referred to by the number 14.

Vibrator 10 may include a hydraulic operating system 15 and support system for the vibrator comprising a cable 16 connected to four separate support cables 17 which are in turn connected to the vibrator through rings 18. A wire cable 19 connects the vibrator with the surface support system such as a boat (not shown) and communicates necessary operating signals and electrical energy to the inside of the vibrator mass which is contained between the sidewalls 11, end wall 12, and top 13. Mass 20 has a pair of shafts 21 extending through mass 20 which are coupled to an end plate 22. Opposite end plate 22 is another end plate (not shown) which anchors the opposite ends of shaft 21 (not shown).

OPERATION

A shear wave signal is generated into the consolidated seabed by the following procedure: The vibrator is gradually lowered into the water and onto the sea bottom 25. Power and electrical commands are communicated through cables 19 to vibrator system 15. Vibrator system 15 is well known and described completely in the patent previously cited in the earlier portion of the specification, but, briefly, consists of selectively controlling the application of hydraulic fluid to pistons attached to shafts 21 in mass 20 which causes the housing to oscillate. Electrical control signals are coupled to a control system which will properly apply hydraulic fluid to the hydraulic cylinders application of an oscillatory force against each side of mass 20. With proper control signals, the force against mass 20 will cause the housing of vibrator 10 to move back an forth horizontally in the direction of arrow 26. As the vibrator moves back and forth, force is applied to end walls 12 causing the end walls to communicate force to the seabed 25. The continual vibration generated by the movement of vibrator 10 will cause the unconsolidated portion of seabed 25 to fluidize; and the vibrator will, as a consequence, sink rapidly through the unconsolidated portion and into the consolidated portion of the seabed represented in FIG. 2 by the number 30 which is normally easily penetrated by the vibrator. It will, as previously mentioned, settle through the unconsolidated portion very rapidly. The consolidated portion represented by number 31 will accept shear wave forces from the vibrator and develop a signal into the subterranean stratum below the seabed causing shear waves to be developed into the subterranean stratum. As vibrator 10 is continually oscillated, the vibrator will sink in the direction of arrow 33. As it sinks the tapered or wedge-shaped walls 12 will continually maintain contact with the seabed consolidated portion 31. The vibrator 10 may sink a considerable distance into the seabed. For this reason the wedge-shaped means must have considerable height in order to accommodate both the unconsolidated material 30 and the settling of the vibrator into the consolidated material 31. This invention is particularly directed to an underwater vibrator which can accommodate a large amount of settling into the unconsolidated material 30 and into the consolidated material 31.

Referring to FIG. 3 a modified embodiment of the is illustrated. In this FIGURE end walls 12 are similar to that illustrated in FIGS. 1 and 2; however, sidewalls 35 are tapered rather than being vertical as illustrated in FIGS. 1 and 2. Surfaces 36 and 37 are tapered toward each other and form a pyramid having an apex 38 and 39, respectively. It should be noted that the angle between a vertical and walls 35 is always less than the angle formed between a vertical and walls 12, 37 and 36. The reason for the above is that, as the vibrator base plate settles into consolidated material 31, the force must always be against end walls 12 and walls 36 and 37. If the angle against wall 35 is less than the angle 12, 37, or 36 as determined for the vertical, then the settling will be against these walls rather than sidewalls 35.

The apparatus illustrated in FIG. 3 operates identical to that illustrated in FIGS. 1 and 2.

FIGS. 4 and 5 illustrate a modified form of the base plate shown in FIGS. 1 through 3. In FIG. 4 additional pyramidal structures having apexes 40 and 41 are illustrated. It should be noted that the pyramids formed by apexes 40 and 41 are not as prominate or high as those formed by apexes 38 and 39. This construction provides a certain amount of settling by vibrator apparatus 10; and, if it continues to settle, then pyramids formed by apexes 40 and 41 will come into play providing additional resistance to settling. FIG. 5 also illustrates that the hydraulic-electric motors, for example, 42 with the associated accumulators 43 and 44 can be mounted in the pyramidal base plate structure rather than on top as illustrated in enclosure 15.

Other necessary apparatus, such as electrical and air storage as illustrated generally by structure 44, can be enclosed in the other pyramidal structure terminating in apex 38.

CONCLUSIONS

An undersea vibrator has been disclosed which permits a large amount of settling of the vibrator into the unconsolidated material prior to its reaching the consolidated material where its signal can be transmitted into the subterranean stratum. Since the entire, or substantially entire, vibrator housing is configured to form a base plate which will transmit a signal into the consolidated material, the vibrator can accommodate a substantial amount of settling into the unconsolidated material prior to reaching the consolidated material. In fact the vibrator as illustrated can settle even over its maximum height and still function quite satisfactorily once it reaches the consolidated material.

It is obvious that changes can be made in the application and still be within the spirit and scope of the invention as disclosed in the specification and appended claims.

What is claimed is:

1. An underwater vibrator apparatus for dispositon on the sea bottom to generate a shear wave seismic signal therein, comprising:
   a housing consisting of a top panel and a bottom enclosure that is formed to include at least two wedge-shaped portions having downwardly directed apices and oppositely disposed, angularly oriented first and second end walls adjacent the respective apices;
   at least one shaft rigidly secured within said housing bottom enclosure between said first and second end walls;
   reaction mass means movably retained on said at least one shaft for reciprocal movement; and
   means for oscillating said reactin mass means on said at least one shaft such that said bottom enclosure continually couples shear wave energy into the sea bottom for a duration as the bottom enclosure settles into the increasingly consolidated depth of sea bottom.

2. Apparatus as described in claim 1 wherein each of said wedge-shaped portions consist of opposite, angularly oriented walls disposed transverse to the axis of said at least one shaft.

3. Apparatus as described in claim 2 wherein said bottom enclosure comprises additional wedge-shaped means positioned between said at least two wedge-shaped portions so that the apex of said additional wedge-shaped means will make contact with the sea bottom at some time after said at least two wedge portions have settled into the sea bottom.

4. Apparatus as described in claims 2 or 3 wherein said wedge-shaped portions each have oppositely sloping end walls and side walls.

5. Apparatus as described in claims 2 or 3 wherein the side walls aligned with the axis of said at least one shaft are vertical relative to said housing top panel.

6. Apparatus as set forth in claim 1 that is further characterized to include two shafts rigidly secured within said housing bottom and having said reaction mass means movably retained thereon.

* * * * *

UNITED STATES PATENT AND TRADEMARK OFFICE
CERTIFICATE OF CORRECTION

PATENT NO. : 4,705,137
DATED : 11-10-87
INVENTOR(S) : Delbert W. Fair

It is certified that error appears in the above-identified patent and that said Letters Patent are hereby corrected as shown below:

Column 3, line 3 - insert the word "housing", such that the line reads --Referring to FIG. 3 a modified embodiment of the housing is--.

Column 4, line 22 - delete "reactin" and insert --reaction--.

Signed and Sealed this

Twenty-ninth Day of March, 1988

Attest:

DONALD J. QUIGG

Attesting Officer

Commissioner of Patents and Trademarks